(12) United States Patent
Fukasawa et al.

(10) Patent No.: US 6,381,205 B1
(45) Date of Patent: Apr. 30, 2002

(54) METHOD AND DEVICE FOR ADJUSTING AN OPTICAL AXIS ANGLE IN AN OPTICAL DISK DEVICE

(75) Inventors: Akihiro Fukasawa; Norio Yamashita, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/457,361

(22) Filed: Dec. 9, 1999

(30) Foreign Application Priority Data

Dec. 11, 1998 (JP) .......................................... 10-352218

(51) Int. Cl.$^7$ ................................................. G11B 7/00
(52) U.S. Cl. ................................ 369/53.19; 369/53.14; 369/5.3
(58) Field of Search ........................... 369/44.32, 53.13, 369/53.14, 53.19, 5.3, 53.35, 53.37, 47.44

(56) References Cited

U.S. PATENT DOCUMENTS

| | | | |
|---|---|---|---|
| 5,502,698 A | * | 3/1996 | Mochizuki ................ 369/53.14 |
| 5,663,942 A | * | 9/1997 | Ishibashi et al. ......... 369/53.34 |
| 5,703,855 A | * | 12/1997 | Kirino et al. ............. 369/53.19 |
| 5,808,984 A | | 9/1998 | Baba |
| 5,825,740 A | | 10/1998 | Kahlman et al. |
| 5,886,962 A | * | 3/1999 | Takamine et al. ........ 369/53.19 |
| 5,898,654 A | * | 4/1999 | Shimada et al. ......... 369/53.34 |
| 6,115,334 A | * | 9/2000 | Tsutsui et al. ........... 369/44.32 |
| 6,172,950 B1 | * | 1/2001 | Tanaka ..................... 369/44.32 |

FOREIGN PATENT DOCUMENTS

| | | |
|---|---|---|
| EP | 0662685 A1 | 7/1995 |
| EP | 0944048 A2 | 9/1999 |
| JP | 2-289928 | 11/1990 |
| JP | 6-19844 | 3/1994 |
| JP | 2768608 | 4/1998 |

* cited by examiner

Primary Examiner—Thang V. Tran

(57) ABSTRACT

An optical axis angle adjusting device is provided, which can adjust the optical axis angle, which can prevent sound skipping or noise in the image of the optical reproduction device even when the disk has certain surface undulation. In the adjusting device, an adjustment disk 10 is inclined relative to the turn table. Rotation phases of the disk are detected, and incident angle is detected at the respective rotation phases. The optical axis angle is adjusted so that the incident angles at the respective phases are identical with each other. Because the disk is inclined, the incident angle can be detected accurately, and the optical axis adjustment can be achieved accurately.

6 Claims, 11 Drawing Sheets

TANGENTIAL DIRECTION

RADIAL DIRECTION

FIG.3
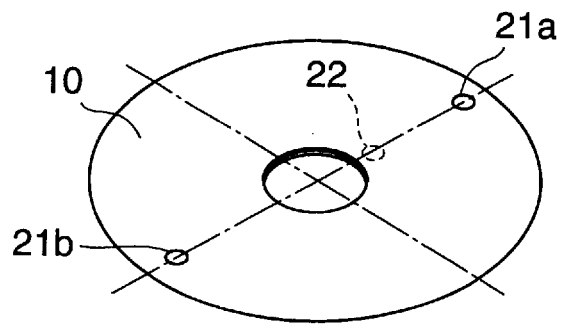
FIG.4
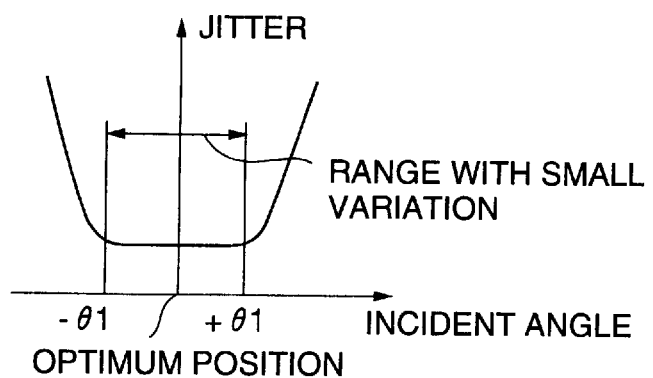
FIG.5A
FIG.5B
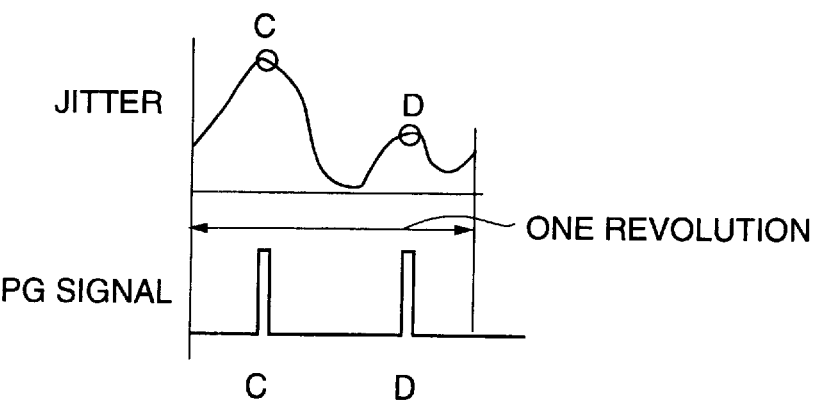

TANGENTIAL DIRECTION

RADIAL DIRECTION

TANGENTIAL DIRECTION

RADIAL DIRECTION

FIG.15A JITTER
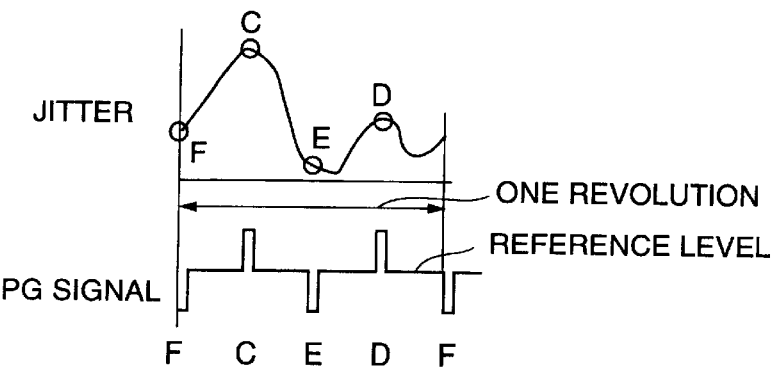
FIG.15B PG SIGNAL
FIG.16
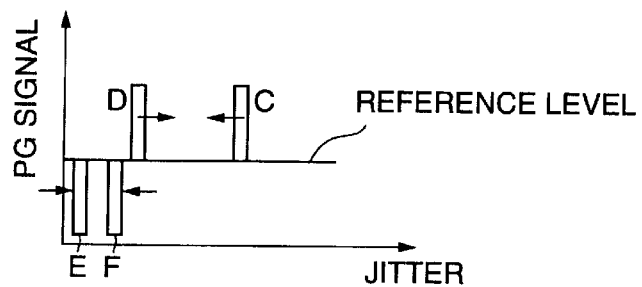
FIG.17
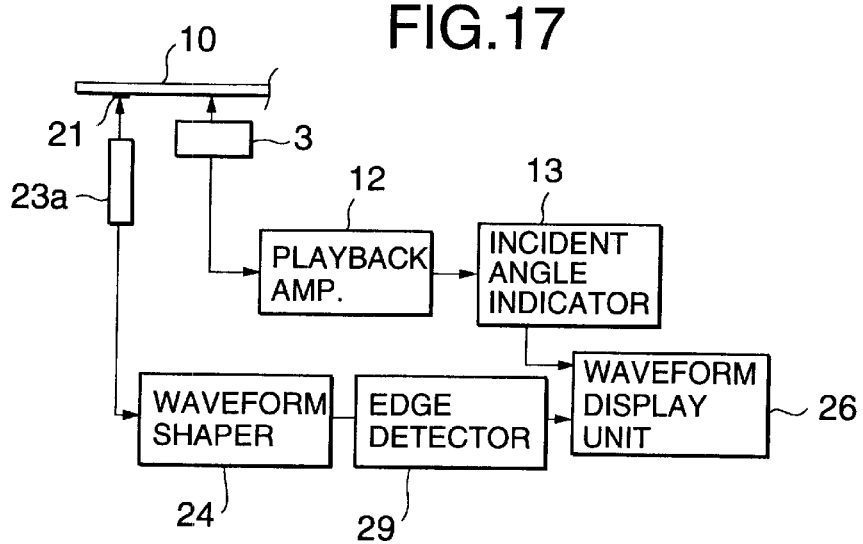

FIG. 18
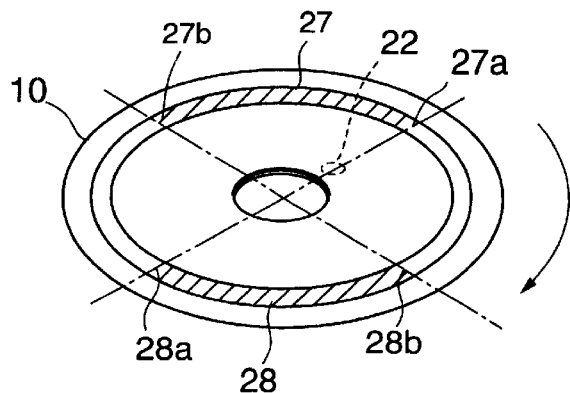
FIG. 19A
WAVEFORM SHAPER OUTPUT
FIG. 19B
PG SIGNAL
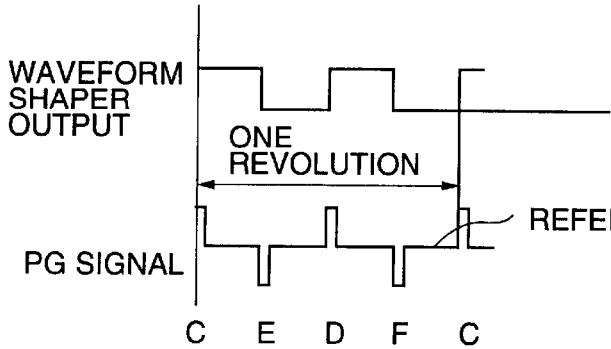
FIG. 20
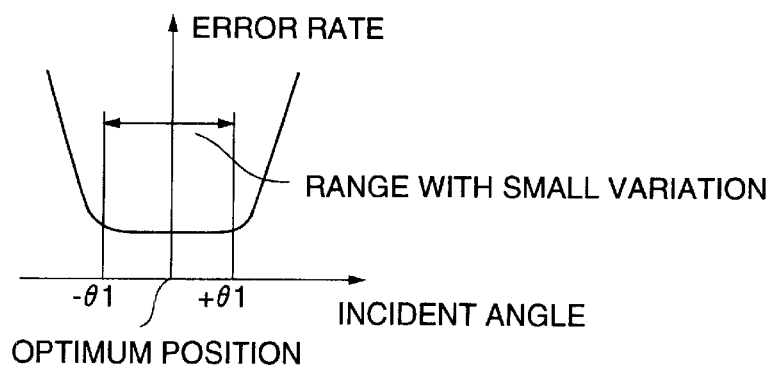

TANGENTIAL DIRECTION

RADIAL DIRECTION

METHOD AND DEVICE FOR ADJUSTING AN OPTICAL AXIS ANGLE IN AN OPTICAL DISK DEVICE

BACKGROUND OF THE INVENTION

The present invention relates to a method of and device for adjusting the optical axis of an optical pick-up of an optical disk device to be normal to the recording/playback surface of the optical disk.

FIG. 22 to FIG. 25 shows a conventional optical disk device, and a device for adjusting the optical axis angle of the optical disk device. Referring to FIG. 22 to FIG. 25, reference numeral 10 denotes an optical disk having spiral or concentric tracks. Reference numeral 1 denotes a main base, 2a and 2b denote a pair of guide shafts fixed to the main base 1 and disposed at a distance from and in parallel with each other, 3 denotes an optical pick-up guided by the guide shafts 2a and 2b in the radial direction of the optical disk 10, and supported by the guide shafts 2a and 2b in such a manner that it can move in direction of the axes of the guide shafts. The signals recorded on the optical disk 10 are read by means of a reflected light resulting from a laser light via an objective lens 3a of the optical pick-up 3. Reference numeral 4 denotes a tangential-direction adjusting screw threaded through a protrusion 3b of the optical pick-up 3, and having an end abutting with one of the guide shafts, 2b. As shown in FIG. 24, when the screw 4 is turned, the optical pick-up 3 is rotated about the other the guide shaft 2a as shown by arrow A, and the optical axis angle of the optical pick-up 3 with respect to the optical disk 10 in the tangential direction is adjusted. Here, the "tangential-direction optical axis angle" means an angle of the optical axis of the optical pick-up 3 as seen in the direction of the guide shafts 2a, 2b (direction in which the guide shafts extend). When the optical axis angle is varied in this direction, the light spot formed by the optical pick-up 3 on the disk 10 is moved in the direction of a tangent on a track at a point confronting the optical pick-up 3.

Reference numeral 5 denotes a motor mounting member fixed to the base 1 by means of fixing screws 6a and 6b, and resiliently fixed by means of a radial-direction adjusting screw 7 extending through a hole in a part 5a of the mounting member 5 distant from the screws 6a and 6b, and threaded through the base 1. As shown in FIG. 25, when the radial-direction adjusting screw 7 is turned, the motor mounting member 5 is rotated about a line interconnecting the fixing screws 6a and 6b as shown by arrow B, for adjusting the radial-direction optical axis angle of the optical pick-up 3 with respect to the optical disk. Here, the radial-direction optical axis angle means an angle of the optical axis of the optical pick-up 3 as seen in direction normal to the axis of rotation of the turn table 9, and to the guide shafts 2a and 2b. When the optical angle is varied in this direction, the light spot formed by the optical pick-up 3 on the disk 10 is moved in the radial direction of the track, i.e., in the direction parallel with the guide shafts.

Reference numeral 8 denotes a disk motor fixed to the motor mounting member 5 by means of screws, not shown. Reference numeral 9 denotes a turn table fixed, by pressure insertion, to the disk motor 8.

The optical disk 10 is placed on the turn table 9, and information recorded thereon can be reproduced by means of the optical pick-up 3. Reference numeral 11 denotes a clamper for clamping the optical disk 10 in cooperation with the turn table 9. It is turned together with the turn table 9 and the optical disk 10 by means of the disk motor 8. Reference numeral 13 denotes an incident angle indicator connected to receive the output of the optical pick-up 3, via a playback amplifier (not shown) and indicating the incident angle (or a value corresponding thereto) of the optical axis of the optical pick-up 3 relative to the surface of the optical disk 10, which corresponds to the optical axis angle of the optical pick-up 3 with respect to the optical disk 10. Because the variation in the incident angle results in a time-axis variation, a jitter meter is used, of which the indication (indicated value) is the minimum when the incident angle of the optical pick-up 3 with respect to the optical disk 10 is zero.

The operations of the above arrangement at the time when signals are reproduced by means of the optical pick-up 3, and when the optical axis angle of the optical pick-up 3 with respect to the optical disk 10 is adjusted will next be described. The optical disk 10 which is clamped by the turn table 9 and the damper 11 is turned in a predetermined direction by means of the disk motor 8. The optical pick-up 3 is moved along the guide shafts 2a and 2b by a drive means (not shown), for continuous or intermittent reproduction from the region where the information is recorded on the optical disk 10. It is desirable that the optical axis of the laser light from the objective lens 3a of the optical pick-up 3 be normal to the optical disk 10, and the time-axis variation (hereinafter referred to as "Jitter") of the signal from the optical pick-up 3 is the minimum. If the optical axis angle is increased, and the jitter exceeds a certain value, skipping of sound, when sound is recorded on the optical disk, or noise in the image, when image is recorded on the optical disk, occurs. To prevent the skipping and noise, the optical pick-up 3 is rotated about the guide shaft 2a, for adjusting the tangential-direction optical axis angle of the optical pick-up 3 with respect to the optical disk 10 so that the indication at the incident angle indicator 13 is the minimum, and also, the motor mounting member 5 and the optical disk 10 mounted thereon are rotated about an axis (a line connecting the screws 6a and 6b) which is normal to the axis of rotation of the turn table 9 and the guide shafts 2a and 2b, by means of the radial-direction adjusting screw 7, for adjusting the radial-direction optical axis angle of the optical pick-up 3 with respect to the optical disk 10 so that the indication at the incident angle indicator 13 is the minimum.

The permissible range of the optical axis angle of the optical disk device differs from one system to another. In a system in which the recording density is low, combining parts of high mechanical precision may be sufficient, and there may be no need for the adjustment. In a system in which the recording density is high, however, the permissible range of the optical axis angle may be narrow, and optical axis angle adjustment is often required in either one or both of the radial and tangential directions, and an optical axis angle adjusting device with a high accuracy is desired.

The optical axis angle adjusting device for the optical disk device in the prior art makes adjustment of the optical axis angle of the optical pick-up 3 with respect to the optical disk 10 such that the jitter is the minimum. The dependency of jitter on the incident angle in the radial and tangential directions is such that it is substantially flat in the region near the optimum position, as shown in FIG. 26. Therefore, even if the incident angle of the image pick-up happen to be θ i before the adjustment, the difference in the jitter compared with that in the optimum position is as small as J1, making it impossible to achieve accurate optical axis angle adjustment. As a result, during reproduction from the optical disk 10 with a surface undulation, jitter may be periodically increased with periodic variation in the incident angle due to the effect of the surface undulation, and sound skipping or image noise may be generated.

SUMMARY OF THE INVENTION

The invention has been made to solve the problems described above, and its object is to provide an optical axis angle adjusting method and device which enable high-precision adjustment of the optical axis angle of the optical pick-up 3 with respect to the optical disk 10, avoiding sound skipping and image noise during reproduction from an optical disk 10 with surface undulation.

According to the invention, there is provided a method of adjusting an optical axis angle in an optical disk device, comprising the steps of:

(a) placing an optical disk on a turn table such that the optical disk is inclined with respect to the turn table;

(b) causing rotation of the turn table on which said optical disk is placed;

(c) reading, by means of an optical pick-up, information signals recorded along a circumferentially-extending track on the optical disk which the disk is rotated, and producing adjustment signals based on the information signals read;

(d) detecting a first rotation phase of the disk and a second rotation phase of the disk which is 180 degrees apart from said first rotation phase,
   an incident angle in a first direction of a light from said optical pick-up onto the disk being the maximum at one of said first and second rotation phase;

(e) indicating said adjustment signals outputted when the disk is at said first and second rotation phases; and (f) adjusting the relative angle between the optical disk and the optical pick-up in said first direction, to thereby adjust said optical axis angle in said first direction;

whereby adjustment in said first direction is performed in said adjusting step (f) based on said indication at said step (e) such that the adjustment signals outputted when the disk is at said first and second rotation phases are at about the same level.

With the above arrangement, the optical axis angle can be adjusted easily and accurately.

The method may further comprises the step of:

(g) detecting a third rotation phase which is separated from the first rotation phase by 90 degrees of rotation of said disk, and a fourth rotation phase which is separated from the third rotation phase by 180 degrees of rotation of said disk;

(h) producing adjustment signals when the disk is at said third and fourth rotation phases based on the information signals read;

(i) indicating the adjustment signals when said disk is at said third and fourth rotation phases; and (j) adjusting the relative angle between the optical disk and the optical pick-up in a second direction orthogonal to said first direction, to thereby adjust said optical axis angle in said second direction;

whereby adjustment in said second direction is performed in said adjusting step (j) based on said indication at said step (i) such that the adjustment signals outputted when the disk is at said third and fourth rotation phases are at about the same level.

With the above arrangement, the optical axis angle can be adjusted easily and accurately both in the first and second directions.

The adjustment signals may represent a time-axis variation of the information signals read by the optical pick-up.

With the above arrangement, the incident angle is detected based on the time axis variation (jitter) of the reproduced signal. Accordingly, it is not necessary to use a mechanical means for detecting the incident angle. Moreover, the incident angle can be detected on a real time basis. Accordingly, the adjustment can be achieved quickly.

The adjustment signals may represent an error rate of reproduced data obtained from the information signals read by the optical pick-up.

With the above arrangement, the incident angle is detected based on the error rate in the reproduced signal. Accordingly, it is not necessary to provide a mechanical means for detecting the incident angle. Moreover, the incident angle can be detected on a real time basis. Accordingly, the adjustment can be achieved quickly.

It may be so arranged that the optical pick-up is be moved in a radial direction of the disk so as to read from different radial positions on the disk, and the first direction is the radial direction.

It may be so arranged that the optical pick-up is moved in a radial direction of the disk so as to read from different radial positions on the disk, and said first direction is the radial direction, and said second direction is a tangential direction normal to the radial direction and to the axis of rotation of the disk.

According to another aspect of the invention, there is provided a device for adjusting an optical axis angle in an optical disk device, comprising:

means for placing an optical disk on a turn table such that the optical disk is inclined with respect to the turn table;

means for causing rotation of the turn table on which said optical disk is placed;

means, including an optical pick-up, for reading information recorded along a circumferentially-extending track on the optical disk which the disk is rotated, and producing adjustment signals based on the information read;

rotation phase detecting means for detecting a first rotation phase of the disk and a second rotation phase of the disk which is 180 degrees apart from said first rotation phase,
   an incident angle in a first direction of a light from said optical pick-up onto the disk being the maximum at one of said first and second rotation phase;

means for indicating the adjustment signals outputted when the disk is at said first and second rotation phases; and means for adjusting the relative angle between the optical disk and the optical pick-up in said first direction, to thereby adjust said optical axis angle in said first direction;

said device thereby enabling adjustment in said first direction by means of said adjusting means based on said indication by said indicating means such that the adjustment signals outputted when the disk is at said first and second rotation phases are at about the same level.

With the above arrangement, the optical axis angle can be adjusted easily and accurately.

It may be so arranged that said rotation phase detecting means also detects a third rotation phase which is separated from the first rotation phase by 90 degrees of rotation of said disk, and a fourth rotation phase which is separated from the third rotation phase by 180 degrees of rotation of said disk;

said generating means also generates the adjustment signals when the disk is at said third and fourth rotation phases;

said indicating means also indicates the adjustment signals when said disk is at said third and fourth rotation phases; and said adjusting means also adjusts the relative angle between the optical disk and the optical pick-up in a second direction orthogonal to said first direction, to thereby adjust said optical axis angle in said second direction;

said disk thereby enabling adjustment in said second direction by means of said adjusting means based on said indication by said indicating means such that the adjustment signals outputted when the disk is at said third and fourth rotation phases are at about the same level.

With the above arrangement, the optical axis angle can be adjusted easily and accurately both in the radial and tangential directions.

It may be so arranged that the adjustment signals used for the adjustment of the optical axis angle of the disk represent a time-axis variation amount.

With the above arrangement, the incident angle is detected based on the time axis variation (jitter) of the reproduced signal. Accordingly, it is not necessary to provide a mechanical means for detecting the incident angle. Moreover, the incident angle can be detected on a real time basis. Accordingly, the adjustment can be achieved quickly.

It may be so arranged that the adjustment signals used for the adjustment of the optical axis angle of the disk represent an error rate of the playback data.

With the above arrangement, the incident angle is detected based on the error rate in the reproduced signal. Accordingly, it is not necessary to provide a mechanical means for detecting the incident angle. Moreover, the incident angle can be detected on a real time basis. Accordingly, the adjustment can be achieved quickly.

It may be so arranged that the optical pick-up is moved in a radial direction of the disk so as to read from different radial positions on the disk, and said first direction is the radial direction.

It may be so arranged that the optical pick-up is moved in a radial direction of the disk so as to read from different radial positions on the disk, and said first direction is the radial direction, and said second direction is a tangential direction normal to the radial direction and to the axis of rotation of the disk.

BRIEF DESCRIPTION OF THE DRAWINGS

FIG. 3 is a perspective view of an adjusting optical disk used in Embodiment 1;

FIG. 4 is a diagram showing the relationship between the jitter and the incident angle in Embodiment 1;

FIG. 5A and FIG. 5B are diagrams showing the jitter and the PG signal as displayed in the time-axis display mode of the waveform display unit in Embodiment 1;

FIG. 15A and FIG. 15B are diagrams showing the jitter and the PG signal as displayed in the time-axis display mode of the waveform display unit in Embodiment 3 of the present invention;

FIG. 16 is a diagram showing the jitter and the PG signal displayed in X-Y display mode of the waveform display unit, in Embodiment 3 of the present invention;

FIG. 17 is a block diagram of an optical axis adjusting device for an optical disk device of Embodiment 4 of the present invention;

FIG. 18 is a perspective view of an adjusting optical disk used in Embodiment 4 of the present invention; of the waveform display unit in Embodiment 4 of the present invention;

FIG. 19A and FIG. 19B are diagrams showing the jitter and the PG signal as displayed in the time-axis display mode of the waveform display unit in Embodiment 4 of the present Invention;

FIG. 20 is a diagram showing the relationship between the error rate and the incident angle;

DETAILED DESCRIPTION OF THE PREFERRED EMBODIMENTS

Embodiments of the Invention will now be described with reference to the drawings.

Embodiment 1

Figure 1:
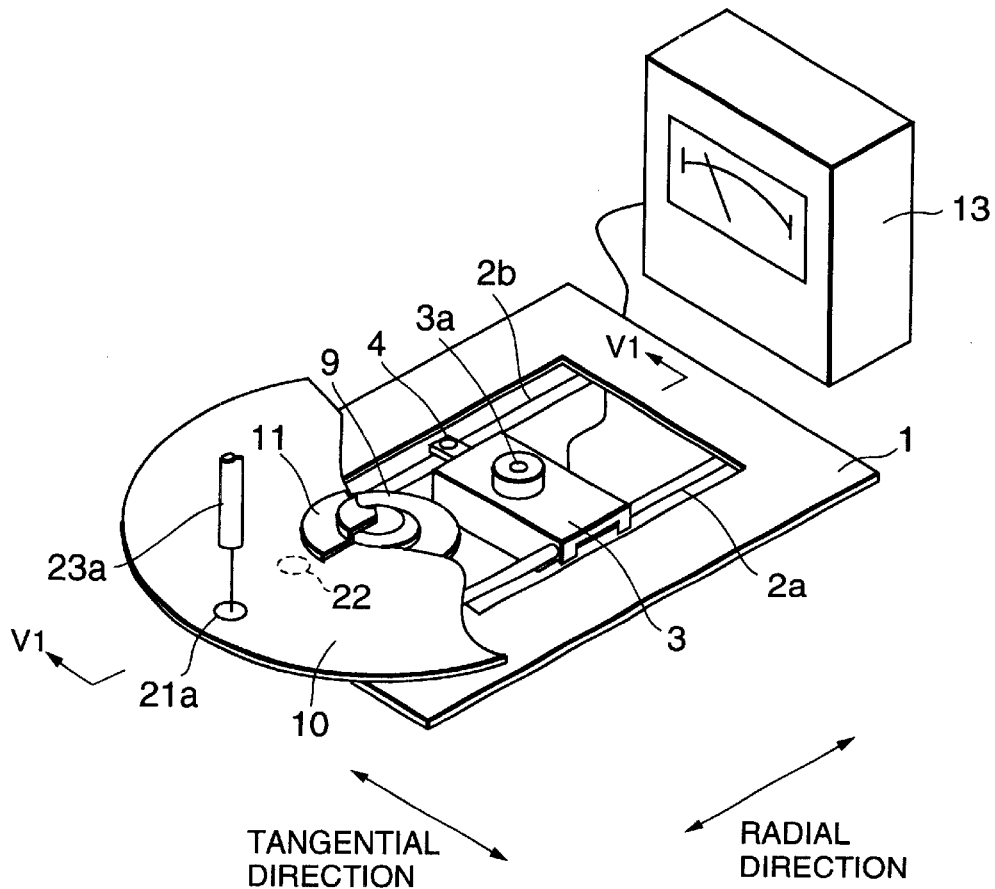
FIG. 1 is a perspective view of an optical axis adjusting device for an optical disk device according to Embodiment 1 of the present invention.
Figure 2:
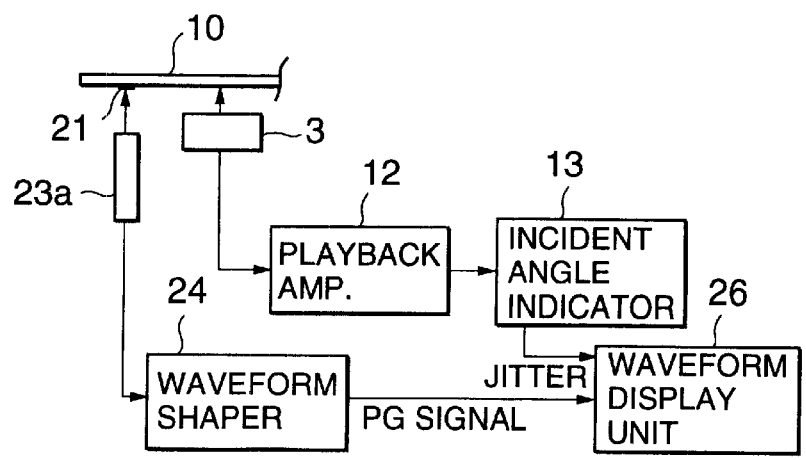
FIG. 2 is a block diagram of an optical axis adjusting device according to Embodiment 1.
Figure 23:
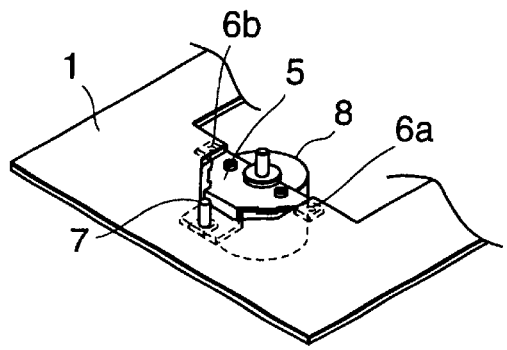
FIG. 23 is a perspective view showing how the motor mounting member is fixed to the main base in an optical disk device in the prior art.
Figure 24:
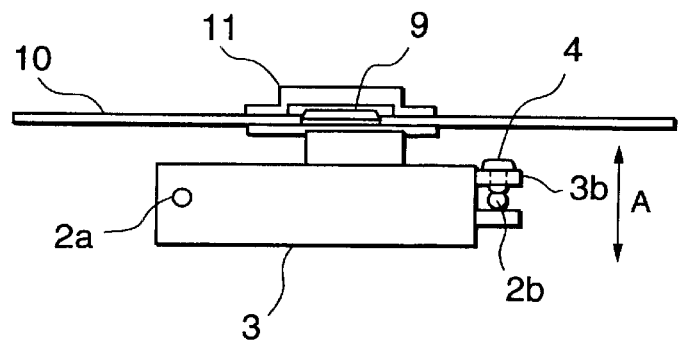
FIG. 24 is an elevational view showing the parts for tangential-direction adjustment in the prior art.
Figure 25:
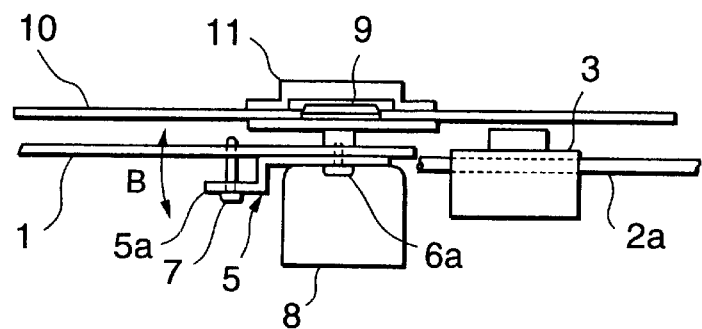
FIG. 25 is an elevational view showing the parts for radial-direction adjustment in the prior art.
Figure 26:
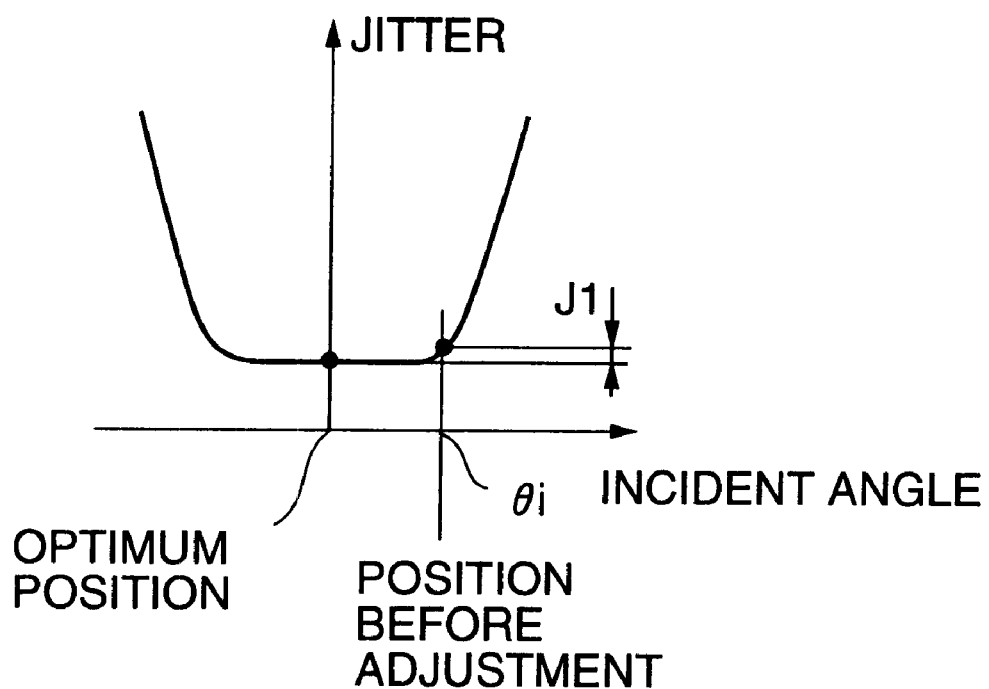
FIG. 26 is a diagram showing the relationship between the jitter and the incident angle in the prior art.

FIG. 1 shows an optical axis angle adjusting device for an optical disk device according to the invention. The configuration of the optical disk device other than the optical axis angle adjusting device are identical to that described as a prior art example so that FIG. 23 to FIG. 25 are also referred to. In the drawings, reference numeral 10 denotes an adjustment optical disk having spiral or concentric, i.e., circumferentially-extending tracks. Reference numeral 1 denotes a main base, 2a and 2b denote a pair of guide shafts fixed to the main base 1 and disposed at a distance from and in parallel with each other, 3 denotes an optical pick-up guided by the guide shafts 2a and 2b in the radial direction of the optical disk 10, and supported by the guide shafts 2a and 2b in such a manner that they can move in direction of the axes of the guide shafts. The signals recorded on the optical disk 10 are read by means of a reflected light resulting from a laser light via an objective lens 3a of the optical pick-up 3. Reference numeral 4 denotes a tangential-direction adjusting screw threaded through a protrusion 3b of the optical pick-up 3 and having one end in abutment with one of the guide shafts, 2b. As shown in FIG. 24, when the screw 4 is turned, the optical pick-up 3 is rotated about the other guide shaft 2a as shown by arrow A in FIG. 24, and the tangential-direction optical axis angle of the optical pick-up 3 with respect to the optical disk 10 is adjusted. Reference numeral 5 denotes a motor mounting member fixed to the base by means of fixing screws 6a and 6b, and resiliently fixed by means of a radial-direction adjusting screw 7 extending through a hole in a part 5a of the motor mounting member 5 distant from the screws 6a and 6b, and threaded through the main base 1. As shown in FIG. 23 and FIG. 25, when the radial-direction adjusting screw 7 is turned, the motor mounting member 5 is rotated about a line interconnecting the fixing screws 6a and 6b (FIG. 23) as shown by arrow B, for adjusting the radial-direction optical axis angle of the optical pick-up 3 with respect to the optical disk 10. Reference numeral 8 denotes a disk motor fixed to the motor mounting member 7 by means of screws. Reference numeral 9 denotes a turn table fixed, by pressure insertion, to the disk motor 8.

The adjustment optical disk 10 is placed on the turn table 9, and information recorded thereon can be reproduced by means of the optical pick-up 3. As is better shown in FIG. 3, the disk 10 is provided with markings 21a and 21b which do not reflect light. The markings 21a and 21b are provided on the surface opposite to the surface on which information is recorded. In the illustrated example, the markings 21a and 21b are formed by attaching pieces of masking tape which do not reflect light. The markings 21a and 21b are positioned in a manner described later.

Reference numeral 11 denotes a damper for clamping the adjustment optical disk 10 in cooperation with the turn table 9. It is turned together with the turn table 9 and the adjustment optical disk 10 by means of the disk motor 8. Reference numeral 12 denotes a playback amplifier connected to the optical pick-up 3.

Reference numeral 13 denotes an incident angle indicator connected to the playback amplifier 12, and indicating the incident angle (or a value corresponding thereto) of the optical axis of the optical pick-up 3 relative to the adjustment optical disk 10, and outputting a signal representing the incident angle (or the corresponding value). Because the variation in the incident angle results in a time-axis variation, a jitter meter is used as the incident angle indicator 13. The indication (indicated value) of the jitter meter 13 is the minimum when the incident angle of the optical pick-up 3 with respect to the optical disk 10 is zero.

Reference numeral 22 denotes a spacer inserted between the turn table 9 and the optical disk 10, and attached to the optical disk 10. Because of the spacer 22, the optical disk 10 is inclined with respect to the turn table 9 by a predetermined angle $\gamma$.

Reference numeral 23a denotes a photosensor of a reflection-type, detecting the marking 21a when the disk is at a first rotation phase (to be described later), and the marking 21b when the disk is at a second rotation phase which is separated from the first rotation phase by 180 degrees. Thus, the photosensor 23a in combination with the markings 21a and 21b forms a rotation phase detecting means for detecting the first rotation phase and the second rotation phase of the optical disk.

The first rotation phase is a phase at which the increase in the radial-direction incident angle due to the insertion of the spacer 22 is the maximum, and the decrease in the distance between the optical pick-up 3 and the optical disk 10 due to the insertion of the spacer 22 is the maximum. As a result, if the radial-direction inclination $\gamma r$ of the disk 10 relative to the turn table 9 due to the insertion of the spacer 22 is sufficiently large compared with the relative radial-direction inclination $\delta r$ between the optical pick-up 3 and the turn table 9, the radial-direction incident angle is the maximum at the first rotation phase, and the distance between the optical pick-up 3 and the optical disk 10 is the minimum at the first rotation phase. The "radial-direction incident angle" means an incident angle as seen in a direction normal to the optical axis of the optical pick-up 3 and the guide shafts 2a and 2b. The "radial-direction inclination $\gamma r$" and the "radial-direction inclination $\delta r$" have similar meanings. They may be also referred to as "radial-direction component of the incident angle" or "radial-direction component of the inclination".

Reference numeral 24 denotes a waveform shaper connected to the photosensor 23a, and converting the outputs of the photosensor 23a into a signal of a rectangular waveform. Reference numeral 26 denotes a waveform display unit connected to the incident angle indicator 13 and the waveform shaper 24, and displaying waveforms of the jitter signal and the PG signal from the respective circuits, on a time axis in a time-axis display mode, or on an X-Y coordinates in an X-Y display mode.

Further description of the adjustment optical disk 10 will be given with reference to FIG. 3. The thickness of the spacer 22 is so set that the adjustment optical disk 10 is inclined by more than $2*\theta 1$, i.e., outside of the range of from $-\theta 1$ to $\theta 1$, outside of which the jitter due to the incident angle is increased rapidly, as shown in FIG. 4 showing the relationship between the jitter and the incident angle. That is, in the range of $2\theta 1$, the variation in jitter with respect to the variation in the incident angle is small, making the incident angle measurement difficult. By inserting the spacer to increase the incident angle, the variation in the jitter with respect to the variation in the incident angle is enlarged, enabling accurate adjustment of the optical axis angle.

In this way, by inserting the spacer 22 to incline the disk 10, the surface undulation occurs as the disk rotates, and the distance between the disk surface and the optical pick-up varies periodically (at a period of one rotation), and the above-mentioned distance is the minimum at a certain rotation phase (first rotation phase), and is the maximum at another rotation phase (second rotation phase) which is separated from the first rotation phase by 180 degrees.

As was described above, the markings 21a and 21b, and the photosensor 23a are used to detect the first and second rotation phases. For the detection of the rotation phases, the positions of the spacer 22, the positions of the markings 21a and 21b, and the position of the photosensor 23a must have a certain relationship. In the configuration shown in FIG. 1 and FIG. 3, the photosensor 23a (in particular, its light receiving surface) is positioned on the opposite side of the optical pick-up 3 with respect to the center of the optical disk 10, and the rotation phase at which that side of the disk 10 provided with the spacer 22 is on the opposite side of the optical pick-up 3 Is the first rotation phase. In this case, it should be so arranged that the marking 21a for the detection of the first rotation phase confronts the photosensor 23a when that side of the disk provided with the spacer 22 is opposite to the optical pick-up 3. Accordingly, the spacer 22 and the marking 21a for the detection of the first rotation phase must be on the same side with respect to the center of the disk, while the marking 21b for the detection of the second rotation phase 21b is on the opposite side to the spacer 22. Thus, the markings 21a and 21b are provided on a line connecting the spacer 22 and the center of the disk 10, on opposite sides of the center of the disk, and at equal distance from the center of the disk.

The operations of the above arrangement at the time when signals are reproduced by means of the optical pick-up 3, and when the optical axis angle in the radial direction of the optical pick-up 3 with respect to the adjustment optical disk 10 is adjusted. The adjustment optical disk 10 which is clamped by the turn table 9 and the damper 11 is turned in a predetermined direction by means of the disk motor 8. Because of the spacer 22, the adjustment optical disk 10 is not held horizontally but is inclined, by the turn table 9 and the damper 11, and surface undulation occurs when the disk rotates. The optical pick-up 3 is moved along the guide shafts 2a and 2b by a drive means (not shown), for continuous or intermittent reproduction from the region where the information is recorded on the adjustment optical disk 10.

When the optical axis of the laser light from the objective lens 3a of the optical pick-up 3 is normal to the adjustment optical disk 10, the jitter of the signal from the optical pick-up 3 is the minimum. If the inclination of the optical axis is increased, and the jitter exceeds a certain value, skipping of sound, when sound is recorded on the disk, or noise in the image, when image is recorded on the disk, occurs. To prevent the skipping and noise, the motor mounting member 5 and the adjustment optical disk 10 mounted thereon are rotated in the radial direction, i.e., about an axis (a line connecting the screws 6a and 6b) normal to the axis of rotation of the turn table and the guide shafts to cause movement of the light spot in the radial direction on the disk surface by means of the radial-direction adjusting screw 7, for adjusting the radial-direction optical axis angle of the optical pick-up 3 with respect to the adjustment optical disk 10.

The operation for adjusting the optical axis angle will now be described in further detail. During rotation of the adjustment optical disk 10, no reflection of light occurs at the markings 21a and 21b, while reflection occurs at other parts. Accordingly, the markings 21 and 21b can be detected by the light sensor 23a. The output signal from the photosensor 23a is passed through the waveform shaper 24, and a signal (called a PG (pulse generator) signal because it is generated due to rotation) comprising two pulses per revolution of the adjustment optical disk 10 is obtained (FIG. 5B). The positions of the pulses on the time axis correspond to the first rotation phase and the second rotation phase of the adjustment optical disk 10 because of the relationship between the positions of the spacer 22 and the markings 21a and 21b, and the photosensor 23a.

Figure 8:
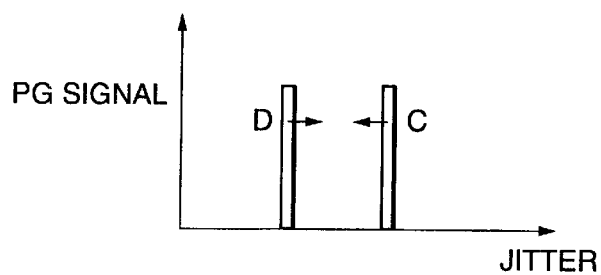
FIG. 8 is a diagram showing the jitter and the PG signal displayed in X-Y display mode of the waveform display unit, in a state in which the jitters at the two different rotation phases are not identical.

The signal reproduced by the optical pick-up 3 is supplied through the playback amplifier 12 to jitter meter 13, and a jitter signal of a level corresponding to the amount of the incident angle is outputted (FIG. 5A). The jitter signal and the PG signal are inputted to the waveform display unit 26, and a waveform on the time axis as shown in FIG. 5A and FIG. 5B is displayed on the screen of the waveform display unit 26 if it is in a time-axis display mode. If the waveform unit 26 is in an X-Y display mode, the jitter and the PG signal are displayed on an X-Y coordinates, as shown in FIG. 8 and FIG. 9, in which X axis (horizontal axis represents the jitter).

Figure 6:
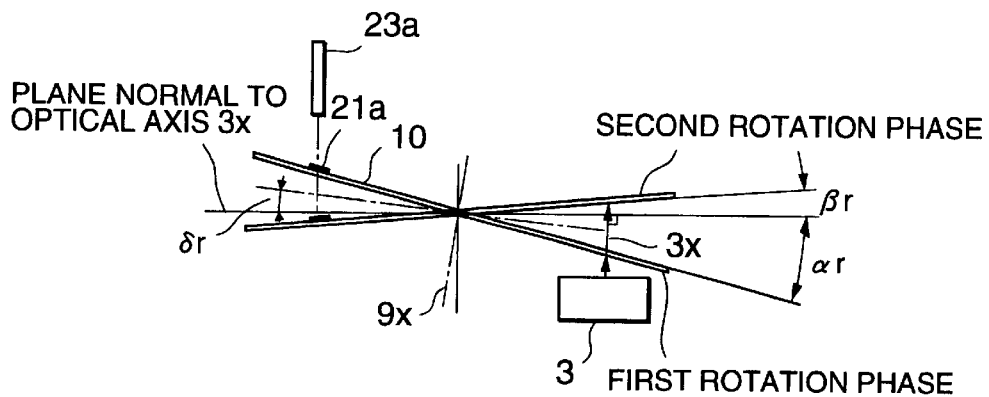
FIG. 6 is an elevational view as seen along line VI—VI in FIG. 1, in a state in which the axis 9x of rotation of the turn table 9 is inclined with respect to the optical axis 3x, in Embodiment 1.
Figure 7:
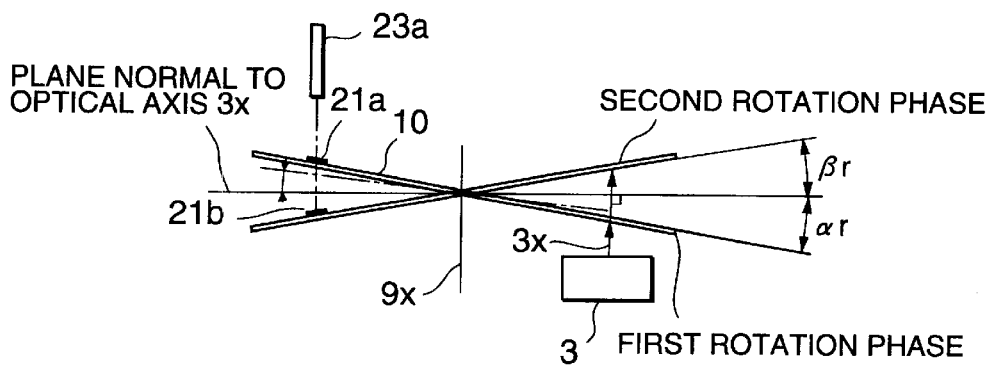
FIG. 7 is an elevational view as seen along line VI—VI in FIG. 1, in a state in which the axis 9x of rotation of the turn table 9 is parallel with the optical axis 3x, as seen in the direction normal to the axis 9x of rotation of the turn table and the guide shafts 2a and 2b.

Before the adjustment, the radial-direction component $\alpha$ r of the angle $\alpha$ between the plane normal to the optical axis 3x and the adjustment optical disk 10 at the first rotation phase, and the radial-direction component $\beta$ r of the angle $\beta$ between the above-mentioned plane and the adjustment optical disk 10 at the second rotation phase may be unequal as shown in FIG. 6 (which shows only the radial-direction components of the angles). This is because the axis 9x of rotation of the turn table 9 is inclined with respect to the optical axis by an angle $\delta$, with its radial-direction component being $\delta$ r, and the surface of the turn table 9 on which the disk 10 is placed is inclined with respect to the plane normal to the optical axis 3x by an angle $\delta$, so that the radial-direction component $\alpha$ of the angle between the disk surface and the plane normal to the optical axis is given by $\alpha$ r=$\gamma$ r+$\delta$ r at the first rotation phase, while that at the second rotation phase is given by $\beta$ r=$\gamma$ r−$\delta$ r. In contrast, when the optimization is achieved by the adjustment, the angle $\delta$ r becomes zero, so that $\alpha$ r=$\beta$ r=$\gamma$ r, as shown in FIG. 7.

If the orientation of the adjustment optical disk 10 is optimized by adjustment by means of the radial-direction adjusting screw 7, the value of the jitter (point C) at the first rotation phase of the adjustment optical disk, and the value of the jitter (point D) at the second rotation phase are of the same level.

Figure 9:
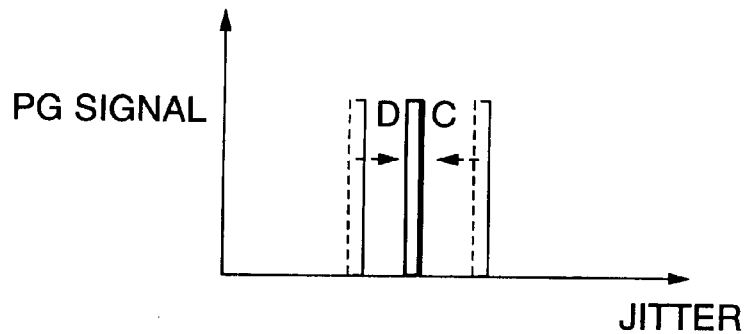
FIG. 9 is a diagram showing the jitter and the PG signal displayed in X-Y display mode of the waveform display unit, in a state in which the jitters at the two different rotation phases are identical.

If the waveform display unit 26 is switched into the X-Y display mode, to display the jitter signal on the X axis and the PG signal on the Y axis, the level of the jitter signal (C) at the first rotation phase and the level of the jitter signal at the second rotation phase represented by the positions of the two pulses on the X axis will coincide, as shown in FIG. 9. In other words, by turning the radial-direction adjusting screw 7 so as to bring the two pulses to the same position, the orientation of the turn table 9 is adjusted to the optimum position. This adjustment can be achieved easily and in a short time.

Figure 10:
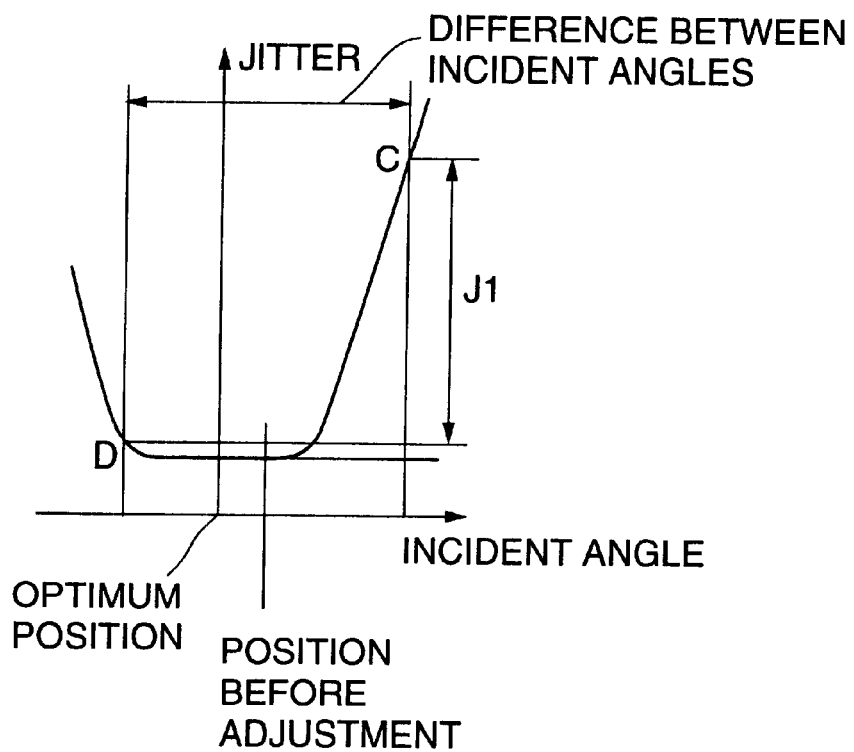
FIG. 10 is a diagram showing the relationship between the jitter and the incident angle.

By using an adjustment optical disk 10 having a surface inclined with respect to the turn table 9, the orientation of the adjustment optical disk 10 in the radial direction can be adjusted with a high accuracy. Further description will be given on this operation referring to FIG. 10 showing the relationship between the jitter and the incident angle. Referring to FIG. 10, even if the orientation of the adjustment optical disk 10 is initially such that the difference in the optical axis angle compared with the optimum state is small (so that the difference in jitter would be small if the measurement were made without the spacer), there is a large difference in the jitter between the first rotation phase and the second rotation phase, as shown by C and D (FIG. 8), because of the surface undulation of the adjustment optical disk 10 due to the insertion of the spacer 22, and an error information of a magnitude J1 is obtained. That is, by the use of the inclined adjustment optical disk 10, the variation in the jitter with respect to the incident angle, i.e., the sensitivity is improved, and the adjustment of the optical axis angle in the radial direction can be made at a high accuracy, and more easily.

Embodiment 2

Figure 11:
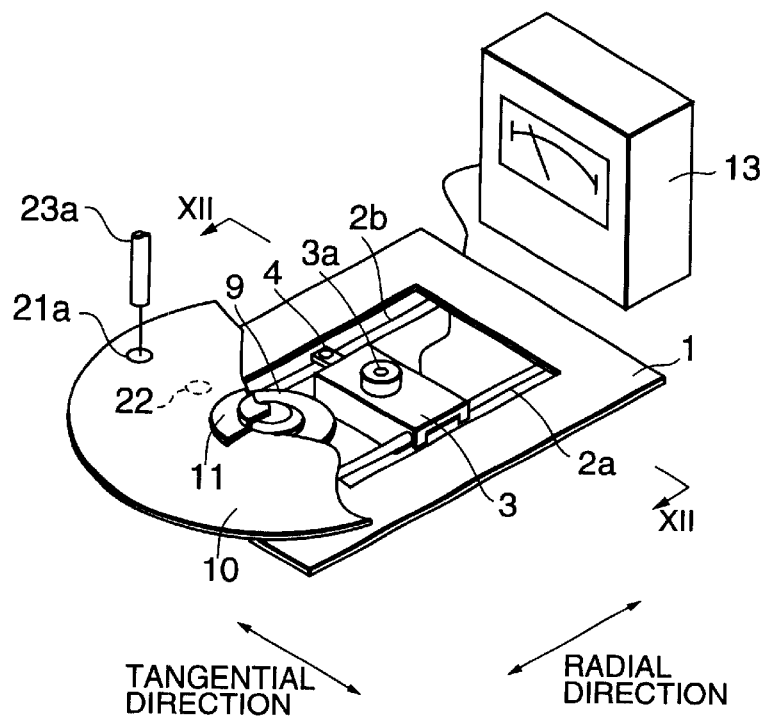
FIG. 11 is a perspective view of an optical axis adjusting device for an optical disk device of Embodiment 2 of the present invention.

Embodiment 2 which is a device for accurately adjusting the optical axis angle in the tangential direction will next be described with reference to FIG. 11 and FIG. 12. The configuration is basically identical to that of Embodiment 1. A difference is that, in place of the photosensor 23a, a photosensor 23b is provided. The photosensor is of a reflection-type, like the photosensor 23a, and is capable of detecting the markings 21a and 21b. The photosensor 23b is mounted at a position different from the position at which the photosensor 23a of Embodiment 1 is mounted. Specifically, the photosensor 23b is mounted at a position to detect the marking 21a when the disk is at a third rotation phase, to be described later, and to detect the marking 21b when the disk is at a fourth rotation phase which is 180 degrees apart from the third rotation phase.

The third and forth rotation phases are separated from the first and second rotation phases referred to in the description of Embodiment 1 by 90 degrees. In the third and fourth rotation phases, the spacer 22 and hence the marking 21a are in a plane including the axis 10x of rotation of the optical disk 10, and normal to the guide shafts 2a, 2b.

In one of the third and fourth rotation phases, at which the increase in the tangential-direction incident angle due to the insertion of the spacer 22 is the maximum. As a result, if the tangential-direction inclination γ t of the disk 10 relative to the turn table 9 due to the insertion of the spacer 22 is sufficiently large compared with the relative radial-direction inclination δ t between the optical pick-up 3 and the turn table 9, the tangential-direction incident angle is the maximum at above-mentioned one of the third and fourth rotation phases. The "tangential-direction incident angle" means an incident angle as seen in a direction of the guide shafts 2a and 2b. The "tangential-direction inclination γ t" and the "tangential-direction inclination δ t" have similar meanings.

For the detection of the above-mentioned third and fourth rotation phases, the photosensor 23b itself (in particular, its light receiving surface) is positioned in the above mentioned plane (including the axis 10x of rotation of the optical disk 10, and normal to the guide shafts 2a, 2b) to confront the markings 21a and 21b when the disk is in the third and fourth rotation phases. In the illustrated example, the third rotation phase is separated from the first rotation phase by 90 degrees in the clockwise direction as seen from the above, and the photosensor 23b is at a position 90 degrees apart from the optical pick-up 3, in the counterclockwise direction about the axis 10x of rotation of the disk, as seen from the above. Thus, the photosensor 23b in combination with the markings 21a and 21b, serves as a means for detecting the third and fourth rotation phases.

The operation for adjusting the optical axis angle in the tangential direction is similar to the operation for adjusting the optical axis angle in the radial direction described in connection with Embodiment 1. That is, the optical axis of the optical pick-up 3 is adjusted by means of the screw 4. By using the adjustment optical disk 10 inclined by means of a spacer 22, the optical axis angle in the tangential direction can be adjusted accurately and easily.

The adjustment by means of the tangential-direction adjusting screw 4 will next be described in detail with reference to FIG. 12, which is a view as seen along line XII—XII in FIG. 11. The optical pick-up 3 is in front of the axis 10x of rotation of the disk 10. Because of the spacer 22, the disk 10 is inclined with respect to a surface 10p normal to the axis 10x of rotation, by an angle γ (FIG. 12 shows its tangential-direction component γ t). When the disk is at the third rotation phase, the marking 21a confronts the photosensor 23b. When the disk is at the fourth rotation phase, the marking 21b confronts the photosensor 23b. If the optical axis 3x of the optical pick-up 3 is inclined relative to the axis 10x of rotation, the light from the optical pick-up 3 is incident on the surface of the disk at an angle (i.e., other than a right angle), and jitter is thereby generated. The amount of jitter is different between a pulse generated when the marking 21a is detected by the photosensor 23b and a pulse generated when the marking 21b is detected by the photosensor 23b. Because the disk is inclined by means of the spacer 22, the inclination of the light from the optical pick-up 3 relative to the disk surface is increased, and the measurement is performed in a range in which the increase in the jitter against increase in the incident angel is large.

Figure 12:
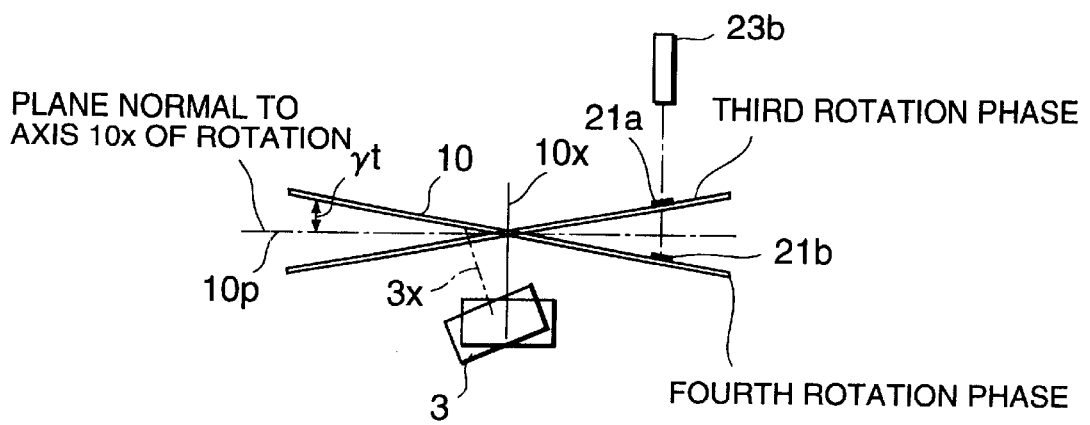
FIG. 12 is an elevational view as seen along line XII—XII in FIG. 11.

When the tangential-direction adjusting screw 4 is turned, the optical pick-up 3 is rotated in a plane parallel to the face of FIG. 12, and the light spot moves in the direction of a tangent of the track on the disk 10, and the tangential-direction component of the inclination of the optical axis 3x of the optical pick-up 3 is reduced. Accordingly, the two pulses on the waveform display unit 26 approach each other. When the orientation of the optical pick-up 3 is optimized, the two pulses will be at the same position. That is, by turning the tangential-direction adjusting screw 4 so as to bring the two pulses to the same position, the orientation of the optical pick-up 3 can be adjusted to the optimum position. This adjustment can be achieved easily and in a short time.

Embodiment 3

Figure 13:
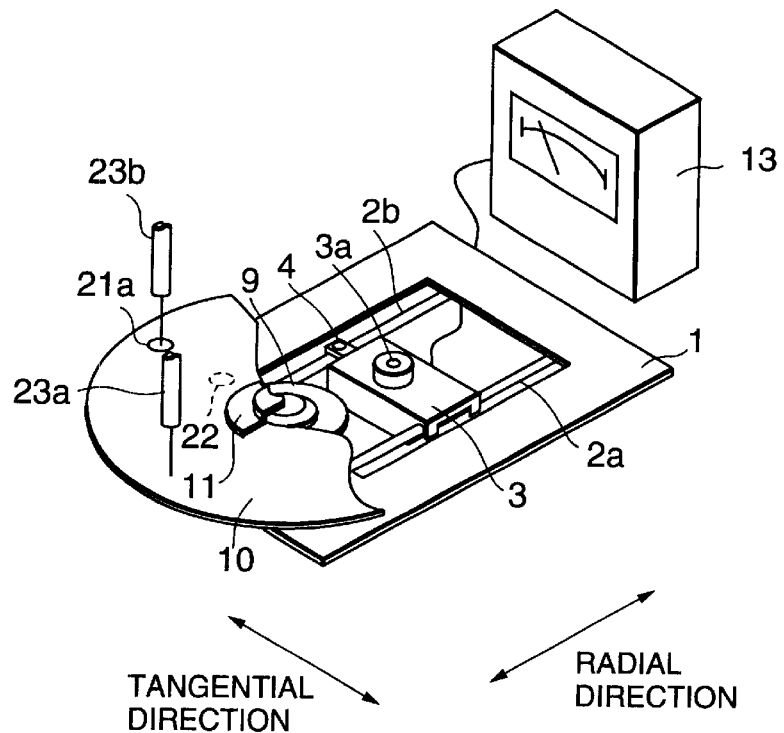
FIG. 13 is a perspective view of an optical axis adjusting device for an optical disk device of Embodiment 3 of the present invention.
Figure 14:
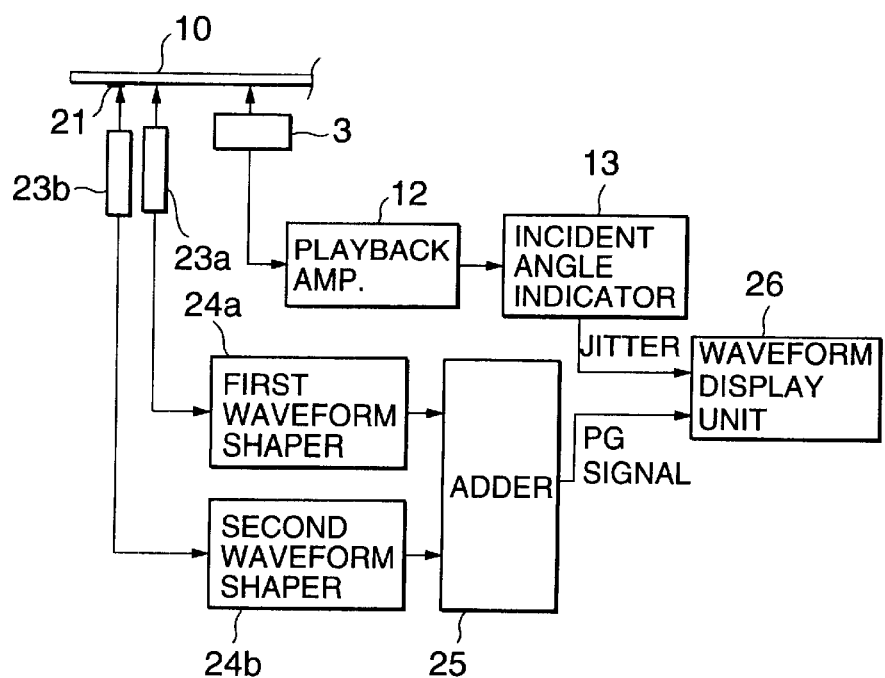
FIG. 14 is a block diagram of an optical axis adjusting device for an optical disk device of Embodiment 3 of the present invention.

Embodiment 3 which is an optical axis angle adjusting device capable of performing the adjustment in both radial and tangential directions will now be described with reference to FIG. 13 and FIG. 14.

Embodiment 3 is similar to Embodiment 1 or Embodiment 2. Differences are that it includes both of the photosensor 23a in Embodiment 1 and the photosensor 23b in Embodiment 2, it includes not only a first waveform shaper similar 24a similar to the waveform shaper 24 in Embodiment 1 but also a waveform shaper 24b similar to a waveform shaper used in Embodiment 2, it includes an adder 25 adding the outputs of the first and second waveform shapers 24a and 24b, and the waveform display unit 26 is connected to receive the output of the adder 25.

The first and second waveform shapers 24a and 24b are configured to generate pulses of opposite polarities. For instance, the first waveform shaper 24a generates positive pulses, while the second waveform shaper 24b generates negative pulses. The adder 25 adds the outputs of the first and second waveform shapers 24a and 24b, and outputs a PG signal including output pulses of the first waveform shaper 24a above a reference level, and output pulses of the second waveform shaper 24b blow the reference level (FIG. 15B).

The Jitter signal from the incident angle indicator 13 and the PG signal output from the adder 25 can be displayed on the screen of the waveform display unit 26 as a waveform on a time axis as shown in FIG. 15A and FIG. 15B when the waveform display unit is in a time-axis display mode, or as shown in FIG. 16 when the waveform display unit 26 is in an X-Y observation mode. In FIG. 15A and FIG. 15B, reference marks C, D, E and F indicate the pulses generated when the disk is in the first, second, third and fourth rotation phases, respectively. In FIG. 16, the horizontal axis represents the jitter at the time when the pulses C, D, E and F are generated. When the radial-direction optical axis angle is adjusted by means of the radial-direction adjusting screw 7, the jitter value at the first rotation phase, and the jitter value at the second rotation phase will be the same. If the waveform display unit 26 is in the X-Y display mode, the two positive pulses will coincide. Similarly, when the tangential-direction optical axis angle is adjusted by means of the tangential-direction adjusting screw 4, the jitter value at the third rotation phase, and the jitter value at the fourth rotation phase optical disk coincide. If the waveform display unit 26 is in the X-Y display mode, the two negative pulses will coincide.

Embodiment 4

Embodiment 4, shown in FIG. 17, FIG. 18, FIG. 19A and FIG. 19B, is an optical axis angle adjusting device which is similar t o that of Embodiment 3 in that it can achieve adjustment of optical axis angle both in radial and tangential directions. Embodiment 4 is similar to Embodiment 3, but differs from it in the following respects. In Embodiment 4, a single photosensor 23a is used for detecting the rotation phase, unlike Embodiment 3 in which two photosensors are used, and a masking pattern including a first and second arcuate strips 27 and 28 is used instead of the dot-shaped markings 21a and 21b (as shown in FIG. 18).

Each of the first and second arcuate strips 27 and 28 extends over 90 degrees. The first strip 27 has a first end 27a positioned on the same side of the center of the disk as the spacer 22, and on a line connecting the spacer 22 and the center of the disk, and a second end 27b at a position 90 degrees separated from the first end 27a in the counter clockwise direction (as seen from the above). The second strip 28 has a first end 28a positioned on the opposite side of the center of the disk to the spacer 22, and on the line connecting the spacer 22 and the center of the disk, and a second end 28b at a position 90 degrees separated from the first end 28a in the counter clockwise direction (as seen from the above).

The photosensor 23a is mounted at the same position as in Embodiment 1. As shown in FIG. 17, an edge detector 29 is connected to receive the output of the waveform shaper 24, and the waveform display unit 26 is connected to receive the output of the edge detector 29.

When the disk having the marking patterns including the strips 27 and 28 is rotated in the clockwise direction as seen from the above in FIG. 18, the ends 27a, 27b, 28a, and 28b passes under the photosensor 23a in the stated order. As a result, the output of the waveform shaper 24 is as shown in FIG. 19A. The edge detector 29 detects the rising edges of the output of the waveform shaper 24 to produce positive pulses, and detects the falling edges of the output of the waveform shaper to produce negative pulses (FIG. 19B). The pulses are identical to those described in connection with Embodiment 3 with reference to FIG. 15B, particularly with regard to the timing at which they are produced and their polarities. The waveform display unit 26 receives these pulses and performs display similar to that described in connection with Embodiment 3.

The rest of the operations are similar to those described in connection with Embodiment 3.

Other Embodiments

In Embodiments 1 to 4, the jitter meter was used as the optical angle indicator 13. As an alternative, means for counting the error rate in the reproduced signal may be used. This is because the error rate in the reproduced signal increases with the incident angle, and the relationship between the error rate and the incident angle is as shown in FIG. 20, which is similar to that of FIG. 4. Because of the similarity, the optical axis angle can be accurately adjusted even in Embodiment 5.

In the various embodiments described above, the masking tape which does not reflect light is attached to serve as markings for detecting the rotation phase. As an alternative, perforations extending through the disk may be formed, or interference film may be formed on the surface of the disk. Either of these can serve as markings for detecting the rotation phase.

Figure 21:
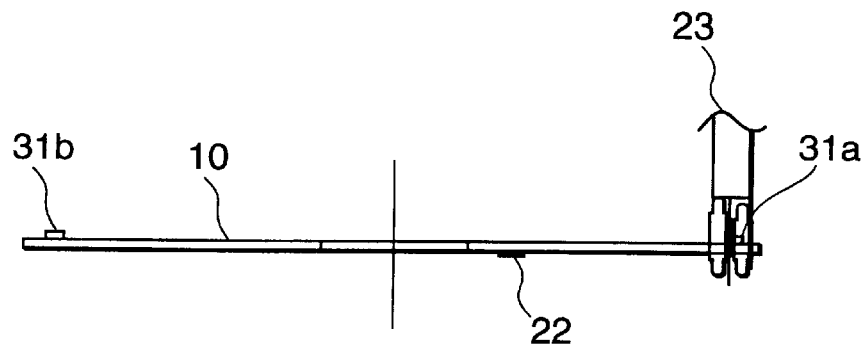
FIG. 21 is an elevational view showing permanent magnets attached to the disk and a magnetic sensor, which may be used for the detection of the rotation phase, in place of optical markings and the photosensor.
Figure 22:
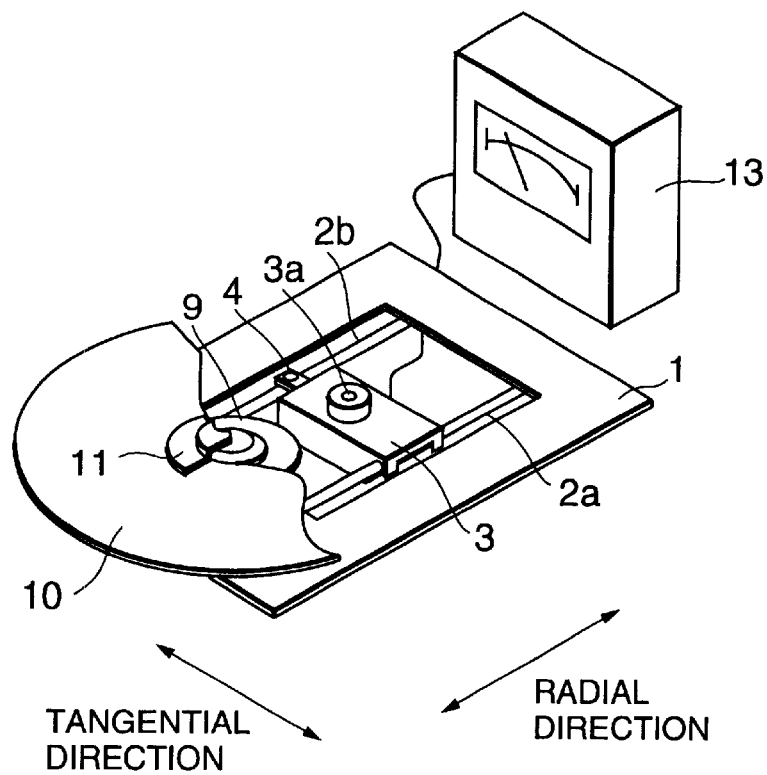
FIG. 22 is a perspective view of an optical axis adjusting device for an optical disk device in the prior art.

As a further alternative, the markings of the adjustment optical disk may be in the form of permanent magnets 31a and 31b, and a magnetic sensor 23 may be used instead of the photosensor, as shown FIG. 21. The magnets 31a and 31b generate magnetic flux only in their vicinities, and the magnetic sensor 23 produces a signal which depends on the magnitude of the magnetic flux density. Since the magnitude of the signal depends only on the magnetic flux density, it does not vary depending on the rotational speed of the disk. Accordingly, even if the adjustment disk rotates at a high speed, the rotation phase can be detected consistently, and the optical axis angle can be adjusted accurately.

In the various embodiments described, markings 21a and 21b are provided for detecting the rotation phase. As an alternative, specific data may be recorded on the disk at specific angular positions on the disk if the disk is of a type permitting writing. In this case, the photosensor or the magnetic sensor are eliminated, but the optical pick-up 3 reads the specific data, and, In combination with a circuitry, not shown, for decoding the data, as well as the specific data recorded at the specific positions on the disk, serves as a means for detecting the rotation phase.

What is claimed is:

1. A method of adjusting an optical axis angle in an optical disk device, comprising the steps of:
   (a) placing an optical disk on a turn table such that the optical disk is inclined with respect to the turn table;
   (b) causing rotation of the turn table on which said optical disk is placed;
   (c) reading, by means of an optical pick-up, information signals recorded along a circumferentially-extending track on the optical disk which the disk is rotated, and producing adjustment signals based on the information signals read;
   (d) detecting a first rotation phase of the disk and a second rotation phase of the disk which is 180 degrees apart from said first rotation phase,
   an incident angle in a first direction of a light from said optical pick-up onto the disk being the maximum at one of said first and second rotation phase;
   (e) indicating said adjustment signals outputted when the disk is at said first and second rotation phases; and
   (f) adjusting the relative angle between the optical disk and the optical pick-up in said first direction, to thereby adjust said optical axis angle in said first direction;

whereby adjustment in said first direction is performed in said adjusting step (f) based on said indication at said step (e) such that the adjustment signals outputted when the disk is at said first and second rotation phases are at about the same level.

2. The method according to claim 1, further comprising the step of:

(g) detecting a third rotation phase which is separated from the first rotation phase by 90 degrees of rotation of said disk, and a fourth rotation phase which is separated from the third rotation phase by 180 degrees of rotation of said disk;

(h) producing adjustment signals when the disk is at said third and fourth rotation phases based on the information signals read;

(i) indicating the adjustment signals when said disk is at said third and fourth rotation phases; and (j) adjusting the relative angle between the optical disk and the optical pick-up in a second direction orthogonal to said first direction, to thereby adjust said optical axis angle in said second direction;

whereby adjustment in said second direction is performed in said adjusting step (j) based on said indication at said step (i) such that the adjustment signals outputted when the disk is at said third and fourth rotation phases are at about the same level.

3. The method according to claim 1, wherein said adjustment signals represent a time-axis variation of the information signals read by the optical pick-up.

4. The method according to claim 1, wherein said adjustment signals represent an error rate of reproduced data obtained from the information signals read by the optical pick-up.

5. The method according to claim 1, wherein said optical pick-up is moved in a radial direction of the disk so as to read from different radial positions on the disk, and said first direction is the radial direction.

6. The method according to claim 2, wherein said optical pick-up is moved in a radial direction of the disk so as to read from different radial positions on the disk, and said first direction is the radial direction, and said second direction is a tangential direction normal to the radial direction and to the axis of rotation of the disk.

* * * * *